July 20, 1965 R. WEIHE 3,195,257

PUNCHED CARD

Filed June 6, 1961 3 Sheets-Sheet 1

Inventor:
Rolf Weihe
By [illegible]
attorney

July 20, 1965 R. WEIHE 3,195,257

PUNCHED CARD

Filed June 6, 1961 3 Sheets-Sheet 2

Inventor:
Rolf Weihe
By Ernest G. Montague
attorney

July 20, 1965 R. WEIHE 3,195,257

PUNCHED CARD

Filed June 6, 1961 3 Sheets-Sheet 3

Inventor:
Rolf Weihe
By Ernest G. Montague
Attorney 3,195,257
PUNCHED CARD
Rolf Weihe, Iserlohn, Westphalia, Germany, assignor to Firma Brause & Co., Iserlohn, Germany, a corporation of Germany
Filed June 6, 1961, Ser. No. 115,168
Claims priority, application Germany, Feb. 20, 1961, B 61,505
5 Claims. (Cl. 40—158)

The present invention relates to a punched card provided with an aperture to receive a reference document, as for instance a film, a microfilm, or the like.

Cards of this kind are used, for instance, for cataloguing of scientific literature, or as index cards for storing and classifying drawings, formulas, recipes, pictures, mathematical or other data, research or source material copied on microfilms.

It has already been proposed to paste or mount a microfilm in an aperture provided in the card so that it is permanently affixed to the card.

It is one object of the present invention, to provide an improved punched card, which is easy to manufacture and which safely retains the reference document, at the same time enabling the film to be easily replaced, without increasing the thickness of the card when mounting a reference document.

It is another object of the present invention, to provide a punched card wherein a pocket is formed of transparent foils which are fixed to the card, the pocket filling a recess or aperture formed in the card and receiving a replaceable reference document. The foil may be secured to one face of the card only to cover the aperture and to have a pocket fitted which receives the film, the pocket being open on at least one side in the aperture, or foils may be secured to both faces of the card to cover the aperture. At least one side of at least one foil is not fixed to the card, to form an opening for the insertion of a reference document.

The aperture may be formed in the card area or at an end of the card. Conveniently, the opening of the pocket registers with the edge of the card. The card may have perforations around the aperture through which the foils on both faces of the card are connected with each other.

The card may be made of paper, pasteboard, or the like and the foils may consist of weldable plastic material to enable the latter to be welded. When the card material is not weldable, the edges of the aperture may be impregnated with a plastic solution which permits the plastic foils to be welded to the card.

With these and other objects in view, which will become apparent in the following detailed description, the present invention will be clearly understood on connection with the accompanying drawings, in which.

Figures 1, 2, 3:
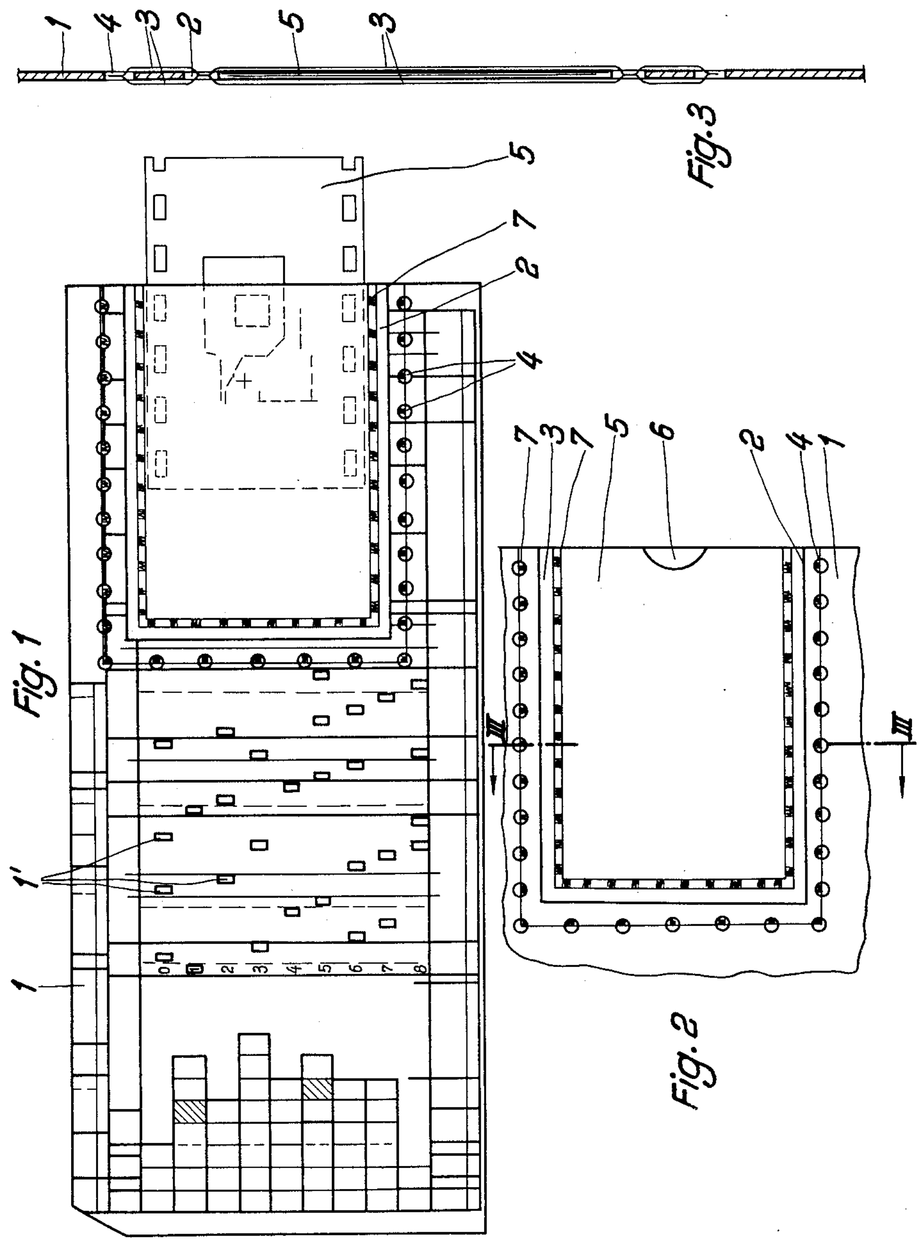
FIGURE 1 is a top plan view of a new punched card with a reference document.
FIG. 2 is a top plan view of the part of the card provided with a reference document, on an enlarged scale.
FIG. 3 is a section along the lines 3—3 of FIG. 2, on an enlarged scale.

Referring now to the drawings, and in particular to FIGS. 1 to 3, the card 1 has the usual headings or it is provided with other inscriptions to be processed in conventional card-handling machines according to a code.

At its one end the card has a cutout portion 2 which is covered with transparent plastic foils 3 from both sides. As can be seen, the plastic foils overlie the edge portion of the card surrounding the cut-out portion 2 to be either pasted or welded to the card. In the latter case it is necessary to impregnate the surface of the card with a suitable solution of plastic material, if the card as a whole is not made of weldable plastic material.

In the embodiment shown in FIG. 1, the card is provided with holes 4 formed around the cut-out portion 2. The foils 3 are welded together through these holes.

In any case, the foils 3 and the cut-out portion together form a pocket 8, which is not much thicker than the card itself and which receives, for instance, a microfilm 5 or the like. A small recess 6 ensures easy opening of the pocket and removal or insertion of the film.

Since the foils extend to the center lines of the holes 4 only, the edges of the foils do not project out from the surface of the card 1 so that in a pile a card cannot catch on another. Inside the cut-out portion 2 the two foils 3 are also connected with each other by a welding seam 7 so that the size of the pocket 8 is accurately defined.

Figure 4:
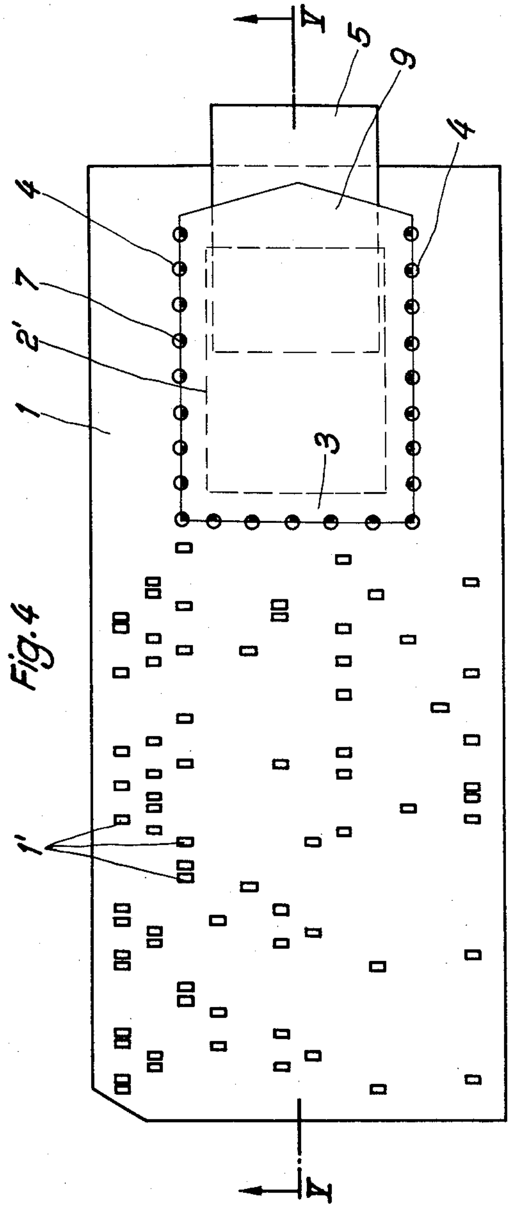
FIG. 4 shows a top plan view of another embodiment of the card with a reference document.
Figure 5:
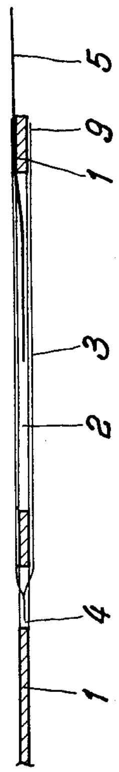
FIG. 5 is a sectional view along the lines 5—5 of FIG. 4.

In the embodiment illustrated in FIGS. 4 and 5, the card 1 has holes 1′ provided on three sides of an aperture 2′ which is surrounded by the card-material. On both faces of the card 1, the aperture 2′ is covered by foils 3, which are welded together through the holes 1′, as described above. As can be seen, welding is provided along three sides only to enable a microfilm 5 to be inserted into the aperture 2′ between the foils 3 and the card 1 from a side 9, where the foils 3 form a projecting flap. This embodiment also enables the foils 3 to be welded together along a line 7 inside the aperture 2′.

Figure 7:
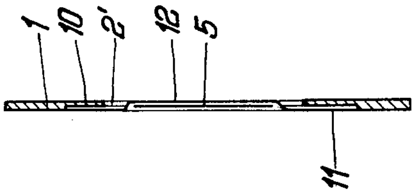
FIG. 7 is a section along the lines 7—7 of FIG. 6.
Figure 6:
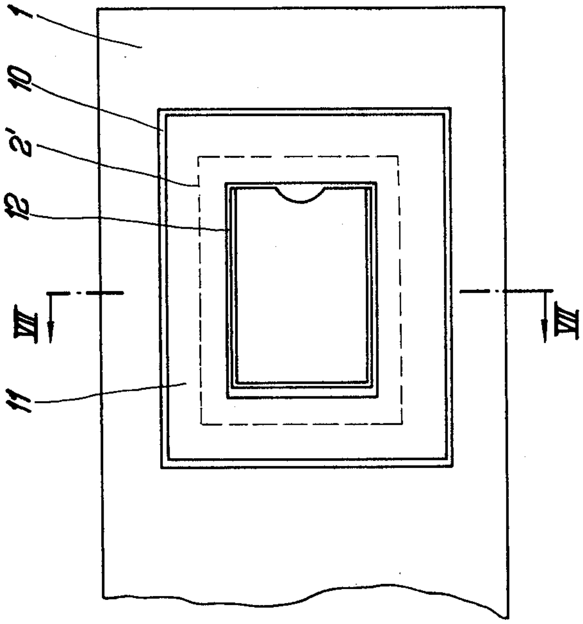
FIG. 6 is a top plan view of another embodiment of the part of the card provided with a reference document.

A further embodiment of the card 1 with an aperture 2′ is shown in FIGS. 6 and 7. Preferably, the card 1 is provided with a depression 10 on the portion of the card surrounding the aperture 2′ and a transparent foil 11 is pasted or welded on the depressed portion in such manner that it does not project out from the surface of the card. Within the aperture, a transparent pocket 12, which is open at one side, is welded to said foil to enable a microfilm 5 or the like to be inserted as described before.

While I have disclosed several embodiments of the present invention, it is to be understood that these embodiments are given by example only and not in a limiting sense, the scope of the present invention being determined by the objects and the claims.

I claim:

1. A punched card having an aperture for mounting a reference document, comprising
   transparent foils permanently secured to said card and forming a pocket open on at least one side,
   said foils being secured to opposite faces of said card and covering said aperture, so that a reference document can be removably and exchangeably inserted into said pocket, and
   said card having a plurality of perforations disposed around said aperture, and
   means for sealing together said foils, disposed on opposite faces of said card, through said perforations to constitute the sole securing means of said foils to said card.

2. The punched card, as set forth in claim 1, wherein
   said aperture is of rectangular shape,
   said transparent foils are of complementary rectangular shape,
   one of said transparent foils is secured to said card along all four edges, and
   the other of said transparent foils is secured to said card along three edges only, thereby forming a pocket open at one side.

3. The punched card, as set forth in claim 1, wherein the opening of the pocket registers with the edge of said card, when said aperture extends to the edge of said card.

4. The punched card, as set forth in claim 1, wherein said perforations of said card are partially covered by said foils.

5. The punched card, as set forth in claim 1, which includes a tongue projection extending from at least one of said foils at the open side of said pocket, in order to simplify the insertion of said reference document into said pocket.

References Cited by the Examiner

UNITED STATES PATENTS

| | | | |
|---|---|---|---|
| 1,397,096 | 11/21 | Hammer | 40—159 |
| 2,511,859 | 6/50 | Langan | 235—61.12 |
| 2,843,955 | 7/58 | Engelstein | 40—158 |
| 3,090,146 | 5/63 | Beispel | 40—158 |
| 3,091,047 | 5/63 | Staehle | 40—158 |

MALCOLM A. MORRISON, *Primary Examiner.*

WALTER W. BURNS, Jr., *Examiner.*